(12) United States Patent
Sumcad et al.

(10) Patent No.: US 8,868,030 B2
(45) Date of Patent: Oct. 21, 2014

(54) AUTOMATED VEHICLE INTRUSION DEVICE

(75) Inventors: Anthony J. Sumcad, Southfield, MI (US); Matthew R. Waldner, Grosse Pointe Woods, MI (US); James Doherty, Wyandotte, MI (US)

(73) Assignee: General Motors LLC, Detroit, MI (US)

( * ) Notice: Subject to any disclaimer, the term of this patent is extended or adjusted under 35 U.S.C. 154(b) by 97 days.

(21) Appl. No.: 13/561,568

(22) Filed: Jul. 30, 2012

(65) Prior Publication Data

US 2014/0031005 A1 Jan. 30, 2014

(51) Int. Cl.
*H04M 11/00* (2006.01)
*H04W 4/02* (2009.01)

(52) U.S. Cl.
CPC .................................. *H04W 4/023* (2013.01)
USPC ........................................................ 455/405

(58) Field of Classification Search
CPC ....... H04W 4/023; H04W 4/16; H04W 60/00; H04W 88/16; H04W 8/22
USPC ............................... 455/405, 425, 557, 456.1
See application file for complete search history.

(56) References Cited

U.S. PATENT DOCUMENTS

| | | | |
|---|---|---|---|
| 2003/0109972 A1* | 6/2003 | Tak .................................. | 701/29 |
| 2004/0203728 A1* | 10/2004 | Schwinke et al. ............. | 455/425 |
| 2013/0316731 A1* | 11/2013 | Lowell et al. .............. | 455/456.1 |

\* cited by examiner

*Primary Examiner* — Kwasi Karikari
(74) *Attorney, Agent, or Firm* — Anthony Luke Simon; Reising Ethington P.C.

(57) ABSTRACT

A method of identifying abnormal activity within a communication system between one or more vehicles and a wireless carrier system. The method may include receiving a first record from a wireless carrier system or a call center. It may further include automatically receiving a second record from a data logger via a vehicle telematics unit. The second record may be a data upload record and includes information pertaining to a wireless connection that includes an event type (mode) and a call type (mode). The event type may indicate whether the wireless connection was SMS, circuit switched, or packet switched. The call type may indicate a transaction during the wireless connection. The method may include determining the occurrence of an abnormal activity based on the first record and the second record. And the method may also include providing a report.

28 Claims, 3 Drawing Sheets

AUTOMATED VEHICLE INTRUSION DEVICE

TECHNICAL FIELD

The present invention relates to detecting wireless communication issues in a vehicle, and more particularly to identifying the source of intrusive activity and gaps in the wireless carrier network.

BACKGROUND

Communication issues in a cellular network may include intrusions, inadequate signal strength at the receiving device, and excessive cellular traffic. These issues may be experienced by owners and occupants of automotive vehicles.

Vehicles have a multitude of computer systems inviting intrusions or attacks by those commonly referred to as hackers. Additional technologies are being introduced bringing smart phone technology to the vehicle and in some vehicles. These vehicles may be equipped with a telematics device and be connected to other electronic devices within and external to the vehicle. Developers often must balance greater flexibility/connectivity within a cellular network with the security of the network and the vehicle.

Inadequate signal strength may be caused for a plurality of reasons. For example, gaps in the cellular network may exist. These gaps may be known or unknown to the cellular provider. In some instances, these gaps may be caused by physical structures and topography.

Cellular traffic also may interfere with an attempted cellular call. For example, where the cellular bandwidth in a given cell is maximized, any further traffic may be limited.

SUMMARY

According to an embodiment of the invention, there is provided a method of identifying abnormal activity within a communication system between one or more vehicles and a wireless carrier system, comprising the steps of: receiving a first record from a wireless carrier system or a call center; receiving a second record from a data logger via a vehicle telematics unit, wherein the second record is a data upload record and includes information pertaining to a wireless connection, wherein the wireless connection includes an event type and a call type, wherein the event type indicates whether the wireless connection was SMS, circuit switched, or packet switched, and wherein the call type indicates a transaction during the wireless connection; and determining the occurrence of an abnormal activity based on the first record and the second record.

According to another embodiment of the invention, there is provided a method of identifying abnormal activity within a communication system between one or more vehicles and a wireless carrier system, comprising the steps of: receiving a archive data from a wireless carrier system; automatically receiving a data upload record from a data logger via a vehicle telematics unit, wherein the second record is a data upload record and includes information pertaining to a wireless connection, wherein the wireless connection includes an event type and a call type, wherein the event type indicates whether the wireless connection was SMS, circuit switched, or packet switched, and wherein the event type further indicates whether a connection request was incoming or outgoing, and wherein the call type indicates a transaction during the wireless connection; determining the occurrence of an abnormal activity based on the first record and the second record; and providing a report based upon the determination.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to identifying (or detecting) the existence of and source of communication problems in a wireless environment used by a mobile vehicle. Problems which may be identified include intrusions or attacks on a wireless network itself (e.g., the wireless carrier system) and on a mobile vehicle which may be sending and receiving various communications wirelessly. Where applicable, call failures additionally may be identified including the specific geographic regions where the failure occurred.

Communications System

Figure 1:
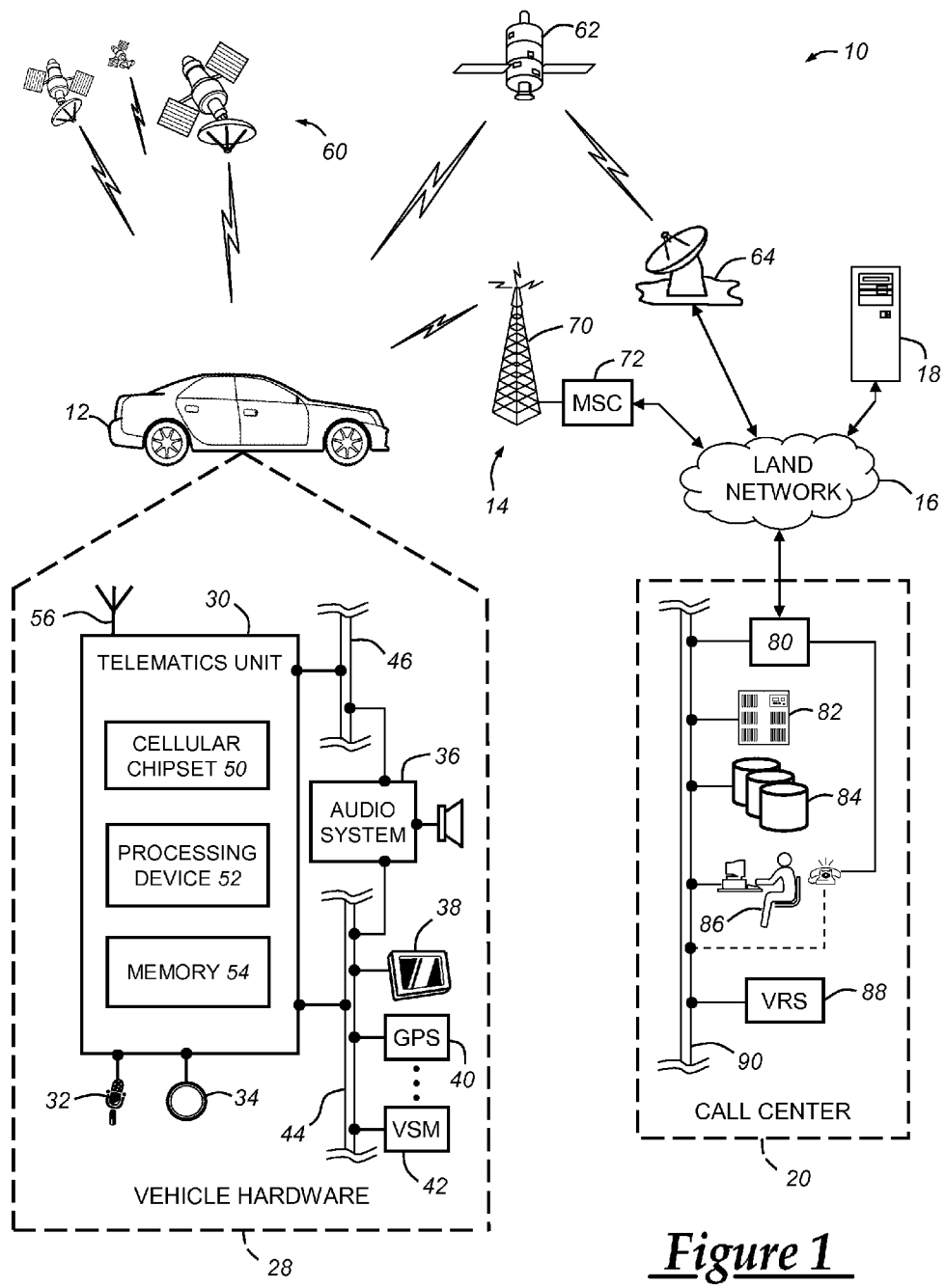
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

The telematics unit 30 may have a connection retry feature. This feature may instruct the telematics unit 30 to continue to attempt to establish a communications channel (or to call or connect) to a specific third party or a recipient when the previous attempt fails. The number of attempts which are made before the telematics unit 30 ceases may be predetermined and/or changed by the manufacturer or service personnel (even remotely via a data transmission or update from the call center 20). In one embodiment, the telematics unit 30 may have a retry sequence when attempting to call any specified recipient (recipients include another wireless device, the call center, etc.). The retry sequence may be an instruction to make a plurality of consecutive attempts to the recipient within a predetermined period of time unless either the call is connected or a predetermined number of attempts is exhausted. Each attempt may be separated by a pause of predetermined length.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein. Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Another embodiment of VSM 42 may be a data logger. A data logger (or a data recorder) may be a device that records data continuously or for a predetermined amount of time. It may have a dedicated processor and/or memory and an independent power source. The data logger may be coupled to one or more sensors, other VSMs 42, and the telematics unit 30. The data logger may begin to write or record over older data when its memory is full (e.g., its memory may record 30 days of data before writing over the oldest data—thus always having a record of the last 30 days). One VSM 42 that may be coupled to the data logger is the GPS module 40. When the vehicle engine is off, the data logger may be powered by the vehicle battery or its own independent power source. The data logger may be modular or integrated into the vehicle 12. And it may operative with software which may be revised or updated from time to time.

In one embodiment, the data logger may have various parameters which may be configured. Configuration may take place prior to the data logger's initial operation and may include updates at a later time. The parameters may include what data is to be recorded. The data logger may record a variety of data pertaining to calls between the telematics unit 30 and other devices in the wireless carrier system(s) 14 and/or the land communication network 16 (which may include the call center 20). This data may include the caller identification (ID) (e.g., a phone number, sender ID, or an IP address), the recipient ID, the time of the call, the length of the call, the base station ID(s) and the the wireless carrier network ID(s) which handled the call, etc. Also, the data logger may record concurrently GPS data received from the GPS module 40; this data also may be time-stamped.

The telematics unit 30 may send or upload recorded data from the data logger (e.g., data upload records) to a remote location such as the call center 20. Data upload records may include all or part of the data recorded during a period or segment of time. This upload may be a manual upload or may be automatically triggered by the data logger. Manual uploads may be commanded by either the user of the vehicle or the call center 20. Automatically triggered uploads are sent to the call center 20 in response to a trigger event (or one or more conditions precedent) which occurs within the data logger. Automatic triggers are another configurable parameter. A few examples of trigger events include timer activity, abnormal activity, and crash activity.

Timer activity may include the expiration of a specified amount of time. For example, the trigger event may be the expiration of a 24-hour period—thus, the call center may receive a daily data upload record from the vehicle 12.

Abnormal activity may include a wide variety of activities. Abnormal activity may be suspicious activity (e.g., by hackers). This suspicious activity may include attempts to manipulate the operation of the telematics unit 30 of the vehicle 12 and includes but is not limited to denial of service attacks, spamming, phishing, spoofing, other network overflows, and hijacking Other abnormal activity may be inadequate service by the wireless carrier system 14. This may occur, e.g., due to gaps in service provided by the wireless carrier system 14 or due to a heavily trafficked wireless network or geographic region (or cell) within the network. Gaps may also occur based upon natural and artificial structures (e.g., mountains, buildings, etc.) and electro-magnetic interference (e.g., other wireless transmissions, solar radiation, etc.). The effects of abnormal activity may vary. In some instances, the vehicle 12 may not be able to place or receive a call. In other instances, malicious changes may be made to the telematics unit 30, other vehicle electronics 28, and/or VSMs 42.

Crash activity may include data from one or more vehicle sensors and/or from a VSM 42 indicating that the vehicle has experienced a crash or accident. The conditions precedent to one or more trigger events may be reconfigured after the vehicle 12 is in service. One of the benefits to this reconfigurable arrangement is that abnormal activity may be continuously redefined according to the most recent security threats.

Since the data upload record may span hours or days, the data upload record may include a history of one or more calls. As here defined, calls include transmissions where the telematics unit 30 was connected to another party (or third party) and also those transmissions where the connection was attempted but not established. For each call, the data upload record may include a call's event type (or event mode) and a call's call type (or call mode).

The event type may indicate the type or channel of transmission; e.g., it may indicate whether the call was SMS, circuit switched, or packet switched. The event type also may include or the directionality of the call. Call directionality indicates whether the call was incoming (i.e., mobile terminated) or outgoing (i.e., mobile originated).

The call type may include what type of transaction took place during the call. Examples of call types are numerous and include but are not limited to personal calls, vehicle data uploads (VDUs), emergency calls, advisor calls, audio file downloads, general packet data, and crash notifications. Personal calls include all calls between the telematics unit and a third party which is not the call center (regardless of the origination of the call). VDU uploads include various vehicle data sent from the telematics unit 30 to the call center 20 (including data upload records). Emergency calls may include 911 calls and calls to Public Safety Access Points (PSAP). Advisor calls include calls between the call center 20 and the telematics unit 30 (regardless of the origination of the call). Audio file downloads may include files for instructional and entertainment value; these downloads may be sent from the call center 20. General packet data includes software updates and may be sent from the call center 20. Crash notifications include automatic calls and user-initiated calls (or manual calls) from the vehicle telematics 30 to the call center 20 due to a vehicle emergency or accident (e.g., a call placed following the deployment of an airbag in the vehicle 12).

In general, the data upload record may identify destination and origination information for any event type. This information includes third party phone numbers (e.g., for circuit switched calls), sender identification (ID) (e.g., for SMS calls), and third party internet protocol (IP) addresses (e.g., for packet switched data). The data upload record also may identify the time the call was sent or received, the duration of the call, the geographic cell(s) in which the vehicle traveled during the call, and other geographic data related to the position of the vehicle during the call (e.g., GPS data). GPS data may include position information at the time the call is initiated or when the call is terminated or both. It may also include GPS position information during the call; e.g., position information may be recorded at a predetermined time intervals; e.g., every 30 seconds.

Data upload records may further include connection retry information. This information may be collected by the data logger when the telematics unit 30 has used the connection retry feature. Thus, the connection retry information may also include data pertaining to any retry sequences which were attempted and to what extent they retry sequence was successful in making the connection—e.g., how many attempts were made prior to the connection or if the call was ultimately unsuccessful and the number of attempts made before the retry sequence was exhausted.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

The wireless carrier system 14 may generate, store, and/or maintain records. These records may contain real-time data and/or archive data pertaining to the communication system 10. The records may include information pertaining to the operation and maintenance of both the carrier system 14 generally and the individual calls and/or connections and call/connection attempts within the carrier system 14. For example, the recorded data may include the mobile directory number, cellular network switching and/or handoffs, connection start and/or stop times (or timestamps), call durations, and various connection and termination details. The records may be stored on computers, servers, etc. within the wireless carrier system 14. One example of archive data stored by a wireless carrier system 14, by way of illustration and not by way of limitation, is Mobile AMA (Automatic Message Accounting) Reporting System or MARS™ data within the Verizon Wireless™ carrier system 14.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The call center 20 may also generate, store, and/or maintain records. Like the records of the wireless carrier system 14, these records also may contain real-time data and/or archive data pertaining to the communication system 10. They may include information pertaining to the operation and maintenance of both the call center 20 generally and the individual calls and/or connections and call/connection attempts between the call center 20 and its subscribers. For example, the recorded data may include the mobile directory number, cellular network switching and/or handoffs, connection start and/or stop times (or timestamps), call durations, and various connection and termination details. One example of real-time data stored at the call center 20, by way of illustration and not by way of limitation, is Verizon Private Network™ (VPN) data.

Among the other back-end functions which may be performed by the call center 20 is the ability to analyze data. The data to be analyzed may be sent to one or more computers and/or servers which may then perform the analysis. The amount of data may be voluminous and the analysis may occur sporadically, or continuously and/or periodically. The data analyzed may include real-time data, archive data, and VDUs (including data upload records). The analyzed data may be stored at the call center 20 or may be derived or received from other places (including the wireless carrier system, its servers, computers, etc.). During the analysis, some data may be flagged as relevant for later analysis or reporting. Those skilled in the art will appreciate that flagging the data may be performed in a variety of ways including but not limited to the use of logical operators (e.g., indicating the state of the data) and defined data structures.

Method

Figure 2:
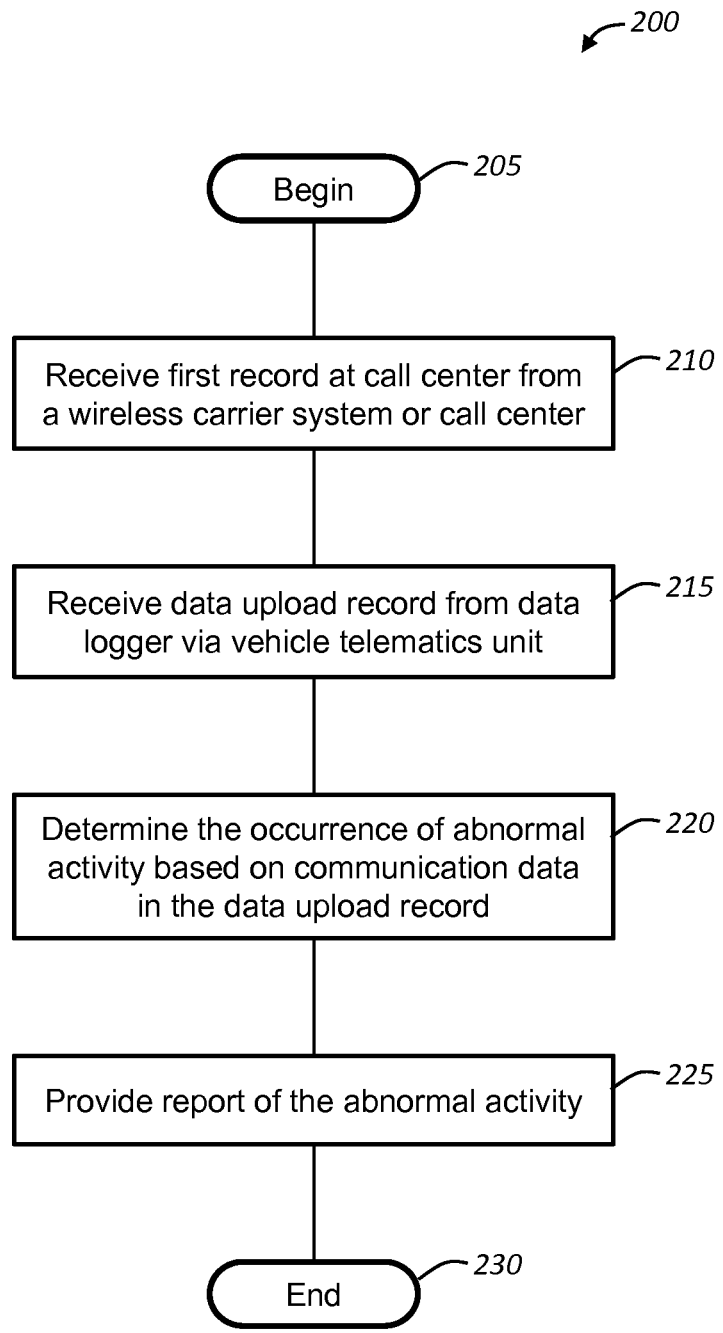
FIG. 2 is a flowchart depicting an exemplary embodiment of a method disclosed herein.

Turning now to FIG. 2, there is shown an exemplary method 200 of identifying abnormal activity between one or more vehicles and a wireless carrier system. One means of identifying abnormal activity may be identifying event type and call type permutations or combinations which do not occur during normal or conventional communication between the vehicle 12 and third parties/recipients. One example of a conventional permutation might include an advisor call (the call type) made over a circuit switched or a packet switched channel (the event type). Another example might include an audio file download (call type) from the call center 20 made over a packet switched channel (event type). Another example might include a VDU (call type) made over a circuit switched or packet switched channel. Other conventional permutations are listed in TABLE I. Unconventional permutations which may suggest abnormal activity include a personal call (call type) using a packet switched channel (event type). Another example might include either an audio file download or a general packet download (call type) using a circuit switched channel (event type). Other permutations which suggest abnormal activity may be found in TABLE I.

TABLE I

Call Permutations

| | Event Type | | | | |
|---|---|---|---|---|---|
| | Channel | | | Direction | |
| Call Type | Circuit Switched | Packet Data | SMS | Mobile Terminated | Mobile Originated |
| Personal Calls | conventional | unconventional | unconventional | conventional | conventional |
| VDU Uploads | conventional | conventional | unconventional | unconventional | conventional |
| Emergency Calls | conventional | unconventional | conventional | unconventional | conventional |
| Advisor Calls | conventional | conventional | conventional | conventional | conventional |
| Audio File Downloads | unconventional | conventional | unconventional | conventional | unconventional |
| General Packet Data | unconventional | conventional | unconventional | conventional | conventional |
| Crash Notifications | conventional | conventional | conventional | unconventional | conventional |

An exemplary method 200 is shown in FIG. 2 of identifying abnormal activity within the wireless carrier system 14. Following the initiation of the method (205), the method describes step 210, receiving a first record from one or more wireless carrier systems 14 or the call center 20. Step 215 describes receiving a second record (a data upload record) from the data logger (one embodiment of VSM 42) via the telematics unit 30 in the vehicle 12. The data upload record may include information pertaining to one or more wireless connections. The wireless connection may include event type and call type information. In one embodiment, the event type may indicate whether the wireless connection was SMS, circuit switched, or packet switched. The event type may further indicate whether the connection was outgoing or incoming. In this embodiment, the call type may indicate the transaction during the wireless connection. As previously described, the transaction may include personal calls, vehicle data uploads (VDUs), emergency calls, advisor calls, audio file downloads, general packet data, and crash notifications. Step 220 then describes determining the occurrence of an abnormal activity based on the first record and the second record. And step 225 describes providing (or generating) a report including at least part of the information contained in the first and second records. The flowchart then concludes or ends 230.

Figure 3:
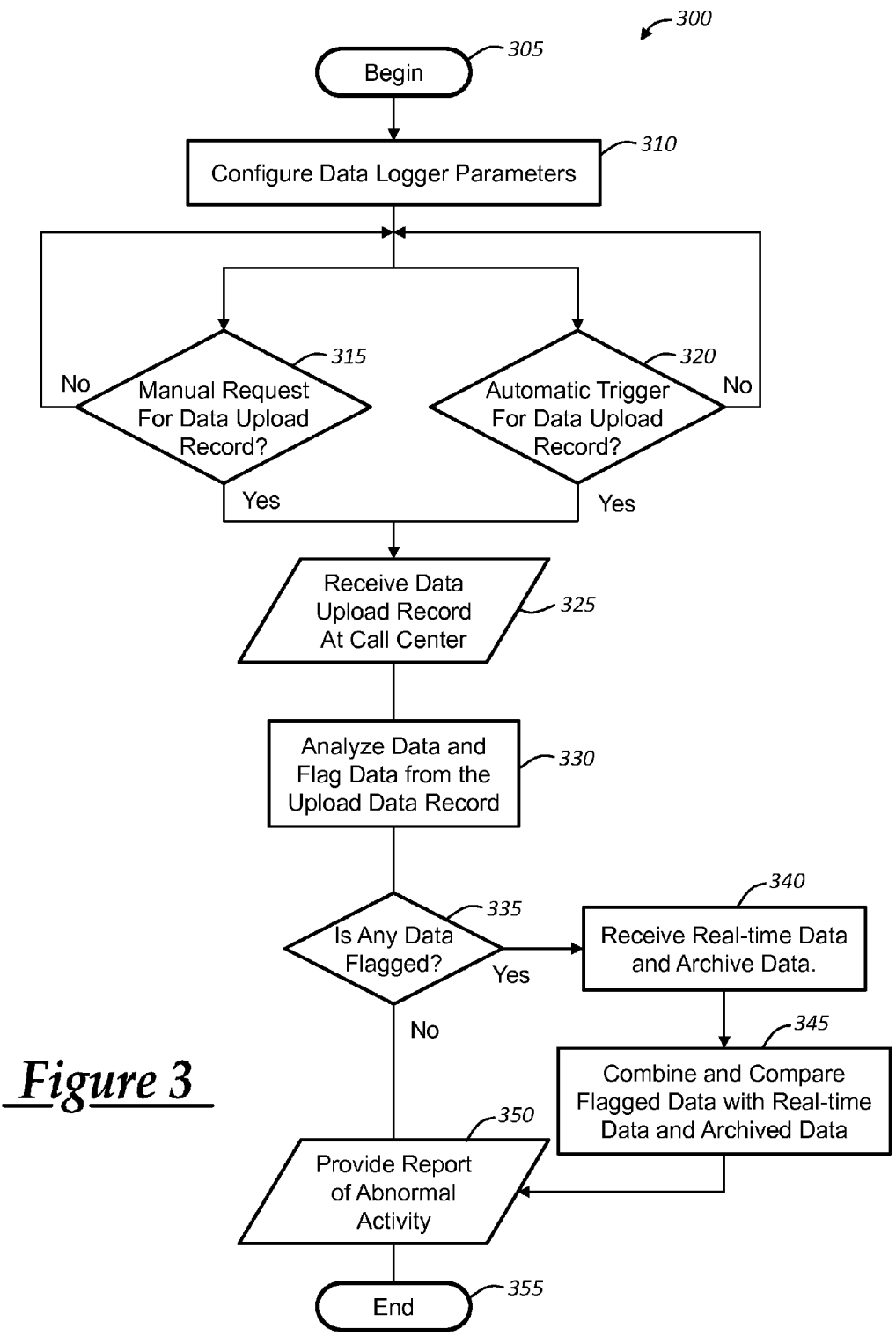
FIG. 3 is a flowchart depicting another exemplary embodiment of a method disclosed herein.

FIG. 3 illustrates another exemplary method 300 of identifying abnormal activity between one or more vehicles and the wireless carrier system 14. Following the beginning of the method (305), the parameters of the data logger (e.g., VSM 42) are configured (310). These parameters may include the period of time in which to record data (e.g., continuously or during an attempted or connected call), the number of attempts to be made in order to connect the call (including retry sequences), and what vehicle position data should be recorded coincident to any call (e.g., GPS data). The flowchart illustrates that one of two paths may be taken prior to the call center 20 receiving a data upload record from the vehicle 12 (325). The data upload record may be received by the call center 20 via a manual upload request (315). Or the data upload record may be received by the call center 20 following an automatic trigger event (320). If neither request is made nor the trigger event occurs, then the method stands-by until one of these actions occur. Upon the occurrence of one of these actions, the call center 20 receives the data upload record (325). At step 330, the data within the data upload record may be analyzed and flagged based upon the presence of predetermined criteria (alternatively, the entire data upload record may be flagged rather than specific data within the record). The predetermined criteria may include dropped calls, connection retry information, and unconventional permutations. At step 335, if any or all of the data upload record is flagged, then records may be received from the call center 20 and/or the wireless carrier system 14, wherein the records may contain real-time data and/or archive data. At step 345, the real-time data and/or archive data is combined with the data upload record and a comparison is made. During this comparison, various methods may be employed to organize and/or compile the data which may then be provided in a report or report-like format (generated at step 350). Returning to step 335, if no part of the data upload record is flagged, then an alternative report may be generated, wherein the report does not contain the real-time data and/or archive data from the call center 20 and/or the wireless carrier system 14. The flowchart concludes with step 355.

The reports (225, FIG. 2; 350, FIG. 3) may be used to assist the call center 20 in analyzing and identifying abnormal activity during interactions between the vehicle 12 and the wireless carrier system(s) 14. For example, when multiple reports are generated from different vehicles (similar to vehicle 12), an increase in the accuracy in identifying specific threats can be achieved. The real-time data and archive data may include data upload records from many different vehicles traveling through a particular cellular region (e.g., a cell). When the data upload record from the data logger 42 of vehicle 12 contains information pertaining to this particular cellular region, this may be compared and evaluated in light of the data acquired from other vehicles to further determine the presence of abnormal activity. In a specific example, where the data upload record from the vehicle 12 indicates an attempted connection which failed and the archive data from the wireless carrier system 14 reveals that other vehicles experienced the same failure, abnormal activity is identified. This could also be true where the archive data from the wireless carrier system 14 reveals that multiple vehicles exhausted a retry sequence in a particular geographic region and the data upload record from vehicle 12 indicates the same occurrence in the same geographic region.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of identifying abnormal activity within a communication system between one or more vehicles and a wireless carrier system, comprising the steps of:
   receiving a first record from a wireless carrier system or a call center;
   receiving a second record from a data logger via a vehicle telematics unit, wherein the second record is a data upload record and includes information pertaining to an established wireless connection,
   wherein the established wireless connection includes an event type and a call type, wherein the event type indicates whether the wireless connection was SMS, circuit switched, or packet switched, and wherein the call type indicates a transaction during the wireless connection, wherein the event type and the call type have an association that is indicative of one of a number of different predetermined call permutations; and
   determining the occurrence of an abnormal activity based at least in part on the indicated one of the predetermined call permutations.

2. The method as defined in claim 1 wherein the data logger has a configurable parameter to automatically trigger the transmission of the data upload record.

3. The method as defined in claim 1, wherein the first record may include archive data or real-time data, and further comprising the step of providing a report based upon the determining step and the first record.

4. The method as defined in claim 3 wherein the archive data is stored on servers maintained by the wireless network system and includes records of individual calls or attempted calls.

5. The method as defined in claim 3 wherein the real-time data includes information pertaining to individual calls or attempted calls.

6. The method as defined in claim 1 wherein the event type further indicates whether a connection request was incoming or outgoing.

7. The method as defined in claim 6 wherein the call types may include: personal calls, VDU uploads, emergency calls, advisor calls, audio file downloads, general packet data, and crash notifications.

8. The method as defined in claim 7 wherein the data upload record includes an SMS identification (ID) for SMS event types, a phone number for circuit switched event types, and an internet protocol (IP) address for packet switched event types.

9. The method as defined in claim 8 wherein the determining step further comprises flagging at least one wireless connection based upon one or more predetermined permutations of the event type, the call type, or both.

10. The method as defined in claim 9 wherein one predetermined permutation includes an event type that is circuit switched and a call type that is personal calling.

11. The method as defined in claim 9 wherein one predetermined permutation includes an event type that is packet switched and an IP address that is not associated with the call center.

12. The method as defined in claim 9 wherein one predetermined permutation includes an event type that is packet switched and vehicle outgoing and a call type that is personal calling.

13. The method as defined in claim 1 wherein the data upload record further includes connection retry information, wherein the connection retry information indicates whether a retry sequence was exhausted.

14. The method as defined in claim 13 wherein the determining step further comprises flagging at least one wireless connection based upon an exhausted retry sequence.

15. The method as defined in claim 4 wherein the first record includes event type, call type, and global positioning satellite (GPS) data from a plurality of vehicles interacting with one or more wireless carrier systems.

16. The method as defined in claim 15 wherein the second record includes GPS data.

17. The method as defined in claim 16 wherein the first record and the second record are used to determine a source of abnormal activity.

18. The method as defined in claim 17 wherein the source is a wireless carrier system attack.

19. The method as defined in claim 13 wherein the source is a gap in the service provided by one or more wireless carrier systems.

20. A method of identifying abnormal activity within a communication system between one or more vehicles and a wireless carrier system, comprising the steps of:
receiving archive data from a wireless carrier system;
automatically receiving a data upload record from a data logger via a vehicle telematics unit, wherein the data upload record includes information pertaining to an established wireless connection,
wherein the established wireless connection includes an event type and a call type, wherein the event type indicates whether the wireless connection was SMS, circuit switched, or packet switched, and wherein the event type further indicates whether a connection request was incoming or outgoing, and wherein the call type indicates a transaction during the wireless connection, wherein the event type and the call type have an association that is indicative of one of a number of different predetermined call permutations;
determining the occurrence of an abnormal activity based at least in part on the indicated one of the predetermined call permutations; and
providing a report based upon the determination and the archive data.

21. A method of identifying abnormal activity within a communication system between one or more vehicles and a wireless carrier system, comprising the steps of:
receiving a first record from a wireless carrier system or a call center;
receiving a second record from a data logger via a vehicle telematics unit, wherein the second record is a data upload record and includes information pertaining to a wireless connection,
wherein the wireless connection includes an event type and a call type, wherein the event type indicates whether the wireless connection was SMS, circuit switched, or packet switched, and wherein the call type indicates a transaction during the wireless connection; and
determining the occurrence of an abnormal activity based on the first record and the second record,
wherein the event type further indicates whether a connection request was incoming or outgoing, wherein the call types may include: personal calls, VDU uploads, emergency calls, advisor calls, audio file downloads, general packet data, and crash notifications,
wherein the data upload record includes an SMS identification (ID) for SMS event types, a phone number for circuit switched event types, and an internet protocol (IP) address for packet switched event types,
wherein the determining step further comprises flagging at least one wireless connection based upon one or more predetermined permutations of the event type, the call type, or both.

22. The method as defined in claim 21, wherein one predetermined permutation includes an event type that is circuit switched and a call type that is personal calling.

23. The method as defined in claim 21, wherein one predetermined permutation includes an event type that is packet switched and an IP address that is not associated with the call center.

24. The method as defined in claim 21, wherein one predetermined permutation includes an event type that is packet switched and vehicle outgoing and a call type that is personal calling.

25. A method of identifying abnormal activity within a communication system between one or more vehicles and a wireless carrier system, comprising the steps of:
receiving a first record from a wireless carrier system or a call center;
receiving a second record from a data logger via a vehicle telematics unit, wherein the second record is a data upload record and includes information pertaining to a wireless connection,
wherein the wireless connection includes an event type and a call type, wherein the event type indicates whether the wireless connection was SMS, circuit switched, or packet switched, and wherein the call type indicates a transaction during the wireless connection; and
determining the occurrence of an abnormal activity based on the first record and the second record,
wherein the data upload record further includes connection retry information, wherein the connection retry information indicates whether a retry sequence was exhausted.

26. The method as defined in claim 25, wherein the determining step further comprises flagging at least one wireless connection based upon an exhausted retry sequence.

27. The method as defined in claim 26, wherein the source is a gap in the service provided by one or more wireless carrier systems.

28. A method of identifying abnormal activity within a communication system between one or more vehicles and a wireless carrier system, comprising the steps of:
- receiving a first record from a wireless carrier system or a call center;
- receiving a second record from a data logger via a vehicle telematics unit, wherein the second record is a data upload record and includes information pertaining to a wireless connection,
  - wherein the wireless connection includes an event type and a call type, wherein the event type indicates whether the wireless connection was SMS, circuit switched, or packet switched, and wherein the call type indicates a transaction during the wireless connection; and
- determining the occurrence of an abnormal activity based on the first record and the second record,
  - wherein the first record may include archive data or real-time data,
  - wherein the archive data is stored on servers maintained by the wireless network system and includes records of individual calls or attempted calls,
  - wherein the first record includes event type, call type, and global positioning satellite (GPS) data from a plurality of vehicles interacting with one or more wireless carrier systems,
  - wherein the second record includes GPS data,
  - wherein the first record and the second record are used to determine a source of abnormal activity,
  - wherein the source is a wireless carrier system attack.

* * * * *